No. 890,203. PATENTED JUNE 9, 1908.
R. VAUGHAN & E. O. NICHOLLS.
COVER FOR COOKING VESSELS.
APPLICATION FILED JAN. 24, 1907.

WITNESSES:
Oliver Williams
Charles D Donohue

Ross Vaughan    INVENTORS
Edward O. Nicholls

BY
Seward Davis
ATTORNEY

UNITED STATES PATENT OFFICE.

ROSS VAUGHAN, OF NEW YORK, N. Y., AND EDWARD O. NICHOLLS, OF LISBON, OHIO.

COVER FOR COOKING VESSELS.

No. 890,203.  Specification of Letters Patent.  Patented June 9, 1908.

Application filed January 24, 1907. Serial No. 353,867.

*To all whom it may concern:*

Be it known that we, Ross Vaughan and Edward O. Nicholls, citizens of the United States, and the former residing in the city of New York and county and State of New York, and the latter residing in the city of Lisbon, county of Columbiana, State of Ohio, have invented certain new and useful Improvements in Covers for Cooking Utensils, of which the following is a specification, reference being had to the accompanying drawings, which form a part thereof.

Our invention relates to covers for cooking utensils, and particularly to an inclosing cover, or bell, adapted to be placed over a culinary vessel, covering and surrounding it and resting upon the heating surface of the stove whereby the heat from the surface of such stove is concentrated and retained with resulting application thereof not alone to the bottom of the culinary vessel in which the objects to be cooked are contained, but also to the sides of same and to whatever is contained therein.

The objects of our invention are to provide an inclosing cover for cooking utensils of the kind described, and a further object of our invention is to provide within such cover means for causing the condensation of the steam or vapors arising from the article being cooked, when liquid is employed therewith, so that the condensed vapor or steam may be precipitated and returned to the culinary vessel containing the food being cooked.

Figure 1:
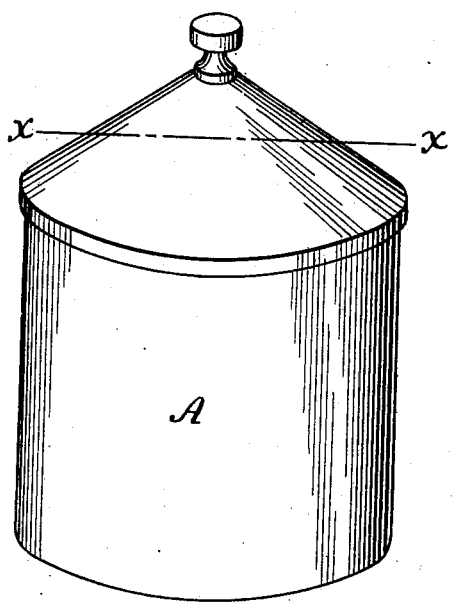
Figure 2:
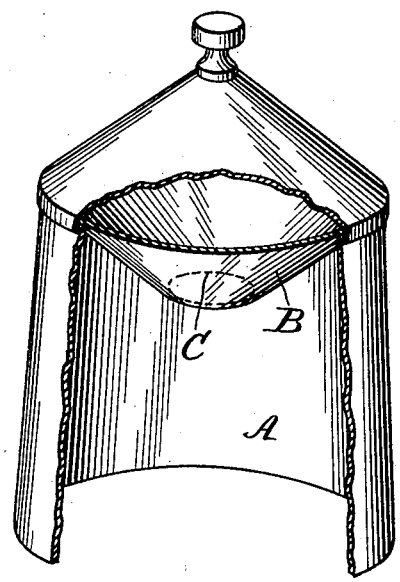
Figure 3:
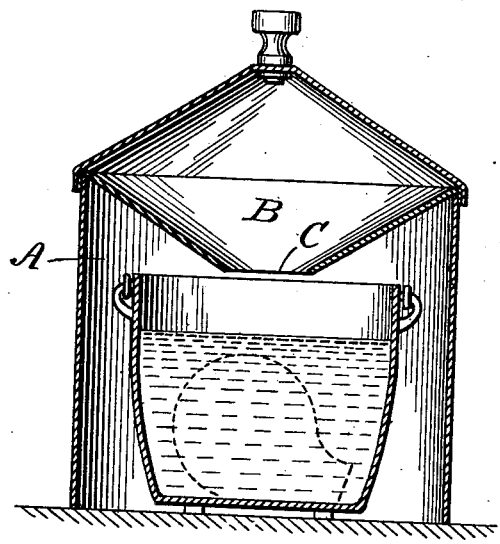

Further objects and advantages of our improved cover are particularly set forth in the detailed description of same which follows:

Referring to the drawings, Figure 1 is a side view in perspective of our improved cover. Fig. 2 is a side view of same with part of the cover broken away to show the condensing means located therein. Fig. 3 is a sectional view of same on the line X X of Fig. 1.

Throughout the drawing like reference letters refer to like parts.

A is the outer or inclosing shield of the cover or bell. This shield is preferably so constructed as to be a non-conductor of heat, as by making it double walled, or by lining it with asbestos, or in any other approved fashion.

The bell is in the form of a truncated cone, open at the bottom and closed at the top where it is provided with a handle. It is preferably made without joints. The part lettered B comprises the inner chamber, which has a circular wall depending from the top of the bell and terminating in the orifice C.

Our improved cover may be made of varying diameters, adapted to so inclose the pot, pan, kettle, or the like in which the cooking is done, as to allow between the sides of the cooking utensil and the inclosing sides of the cover, a clearance to permit heat from the fire or range to pass up around the sides of the cooking utensil. It serves to prevent the dissipation of heat from the fire by air currents, and to concentrate the heat on the sides of the vessel, and to retain the heat above and around it. As we have found in practice and as we believe is well known, a cooking utensil heated from a fire applied at its bottom only, requires, other conditions being the same, nearly twice as long to be brought to a boiling point, as does one upon which the heat is concentrated by surrounding it with fire. As the top of our cover and the inner chamber formed dependent therefrom, will be relatively the less heated parts of the device, the steam and vapors arising from the boiling liquid contained in the receptacle in which the food is being cooked will condense upon this surface and the fluid resultant will be returned to the receptacle. This precipitation and return of the steam arising from the cooking articles serves to enrich the boiling medium and preserve the juices and flavor of the thing cooked; furthermore, the return of the fluid by concentration serves to preserve the quantity of the liquid in the receptacle and prevents the thing cooked from being burned by boiling away of the liquid in which it is being cooked. Further advantage from our cover is that the liquid in the receptacle will not boil over, as no other cover is needed and by avoiding the use of a tightly fitting lid, steam is not confined, and the danger of boiling over is avoided.

Further advantage of the use of our cover is, that the odors of cooking are prevented from escaping into the room and are returned to the fire and carried off by the flue.

Our cover is an article that may be readily cleaned and kept in sanitary condition, and has the advantage of being cheaply manufactured, and by its use the consumption of fuel is materially reduced.

Having thus described the preferred embodiment of our invention, which it is ob- vious may be modified in structure without loss of the benefits and advantages as above recited, we desire to claim:

1. A cover for culinary utensils comprising a bell adapted to rest upon the stove and inclose and surround the utensil, said bell having an open bottom and closed top, and having within it and between the top and bottom, a truncated inverted cone.

2. An inclosing cover for culinary utensils comprising an open bottom shield adapted to rest upon the stove, said shield bearing at its upper end an erect cone forming a closure for said end, and also a shallow inverted cone below said erect cone, said inverted cone being truncated to form a circular orifice.

3. A cover for culinary utensils comprising an open bottom bell adapted to rest upon the stove and to inclose the utensil, and provided with an outer heat retaining chamber and with an inner condensing chamber.

4. A cover for culinary utensils comprising an open bottom bell having an inverted conical apertured wall dividing the said bell into upper and lower chambers.

5. A cover for culinary utensils comprising an open bottom bell in the form of a truncated cone, and having a dividing wall in the form of an inverted cone, said last named cone being truncated to form a circular orifice.

ROSS VAUGHAN.
EDWARD O. NICHOLLS.

Witnesses:
SEWARD DAVIS,
OLIVER WILLIAMS.